United States Patent [19]

Murphy

[11] 3,894,482
[45] July 15, 1975

[54] COOKING OIL FILTERING

[76] Inventor: John R. Murphy, 47-478 Apau Loop, Honolulu, Hawaii 96744

[22] Filed: May 15, 1972

[21] Appl. No.: 253,109

[52] U.S. Cl. ............... 99/330; 99/408; 210/DIG. 8; 210/167; 210/314; 210/DIG. 8;167;314;339
[51] Int. Cl. ............................................. A47j 37/12
[58] Field of Search ............................. 99/330, 408

[56] References Cited
UNITED STATES PATENTS

| | | | |
|---|---|---|---|
| 2,495,031 | 1/1950 | Stovall | 210/339 |
| 3,107,601 | 10/1963 | Longmire | 99/330 |
| 3,159,095 | 12/1964 | Wagner | 99/408 |
| 3,210,193 | 10/1965 | Martin | 99/330 |
| 3,279,605 | 10/1966 | Shepherd | 210/482 X |
| 3,280,722 | 10/1966 | Rahauser | 99/408 |
| 3,355,026 | 11/1967 | Schut | 210/DIG. 8 |
| 3,368,682 | 2/1968 | Boots | 99/330 |
| 3,410,199 | 11/1968 | Quednau | 99/408;330 |
| 3,581,896 | 6/1971 | Kuhlman | 210/167 |
| 3,608,472 | 9/1971 | Pelster et al. | 99/330 |
| 3,688,683 | 9/1972 | Boggs | 99/330 |
| 3,701,313 | 10/1972 | Boggs | 99/330 |

*Primary Examiner*—Billy J. Wilhite
*Attorney, Agent, or Firm*—James C. Wray

[57] ABSTRACT

Cooking oil drains from a cook pot through a filter into a relatively large tank at the end of a cook cycle. Filtered oil is pumped from the tank into the cook pot before again cooking foods. If the filter is clogged, and filtered oil is not available in the tank, a valve is immediately switched to draw oil from the cook pot. The filter is an elongated rectangular box having a plenum at one end and having a hinged cover, so that filter elements may be lifted upward out of the filter box. The elements are a baffle frame laterally surrounded by primary and secondary spaced screens. Oil enters the box from one end and laterally flows from sides and the bottom of the box.

5 Claims, 10 Drawing Figures

COOKING OIL FILTERING

BACKGROUND OF THE INVENTION

In deep fat frying systems, food is cooked within hot oil held in a cooking pot. On some occations, oil is heated while it is in the cooking pot by heating means which surround the cooking pot or which contact a surface of the cooking pot, or by heating means within the cooking pot. In other systems, oil is circulated from the cooking pot through external heating means associated with the cooking pot and back into the cooking pot. The cooking pot may be open for cooking at atmospheric pressure, or the pot may be sealed while water in the food creates steam which pressurizes the cooking pot system.

In the cooking of food, best results are obtained by filtering the oil. While the oil may be filtered during the cooking process by cycling the oil through a filter attached to a drain means and then back into the cooking pot during the cooking process, the usual practice is to filter the oil between subsequent cooking operations. In some systems, oil simply drains through a filter into a bucket which is then dumped into the cooking pot. In other systems, a filtering device is connected to a drain, and a pump intake is connected directed to the filtering device to pump oil from the device back into the cooking pot systems. In such systems, pumps are used to draw oil through the filters. Holding tanks may be associated with the filters. One problem encountered in the use of deep fat fryers having cooking pots, oil heating means associated with the cooking pots, drain means, filters and pumps for returning oil to the cooking pot, is that pump life is considerably less than the life of the remaining elements. Investigation has revealed that pump life is often diminished by the lack of oil flowing through the pump. When oil is blocked such as by drawing oil through clogged filters, insufficient oil is supplied to the pump, and relatively moving elements which depend upon the oil for lubrication and for preventing high heat buildup in moving parts of the pump, such as rotor bearings, eventually are destroyed.

Pump destruction and consequent cooking apparatus down time may be especially uneconomical in systems which employ pressurized cooking pots with circulating heating means and in which oil drains into sumps between cooking cycles and is drawn from the sump through large diatomaceous earth filters as the cooking pot is filled with oil for another cooking cycle.

Cooking oil filters of the prior art have created difficulties in becoming prematurely clogged with inherent flow reduction due to design.

SUMMARY OF THE INVENTION

The present invention overcomes problems of the prior art by providing a deep fat frying system which employs a filter connected to a drain of a cooking pot with the filtrate flowing directly into a separate tank, which holds the filtered oil. The filtered oil is pumped directly from the tank. When filtered oil is no longer available, an intake valve is changed to draw oil from the cook pot. The pump draws pure filtered oil freely from a reservoir and never is required to draw oil directly from a filter.

The filter of the present invention is constructed to provide maximum through flow while entrapping particulate material of all sizes and exhausting a clear particle-free filtrate.

The system of the present invention is useful with any deep fat frying system having a cooking pot, a heating means associated with the cooking pot, a drain means connected to the cooking pot for passing oil from the cooking pot, and a pump means for lifting the oil.

In a preferred embodiment of the invention, the filter means is connected to the drain means so that the oil may drain from the cooking pot directly into the filter. The filter drains directly into a separate tank which collects the oil while the cooking pot is being completely drained. When the cooking pot is drained, the tank may be emptied by a pump back into the cooking pot. When the level of filtered oil available in the tank falls below a certain predetermined level, a limit switch changes the intake of the pump.

Preferably, the filter is mounted on an end of the drain and is constructed and positioned so that oil may flow through a maximum surface area of the filter directly into the sump.

In a preferred embodiment, the oil flows into one end of an elongated filter and laterally out through filter elements. Open ended elements are telescoped together and are spaced slightly apart laterally to accomodate storage of built up filter material without interferring with lateral flow. One element may have several screens which are constructed of similar cross section with successively larger transverse dimensions. Spacers hold the screens apart. In the preferred embodiment, a baffle frame is mounted within the filter screens to promote even flow of the oil to remote areas of the filter, to uniformly slow flow of oil through the filter, and to trap large particles. An open-ended fine screen surrounds the baffle assembly. Spacers externally ring ends of the screen to space the next filter element outward from the screen. One or more screens may be employed, and the screens may have varied size openings. Spacers hold the screen separated.

Periodically, a fine polishing screen replaces the filter elements or surrounds the first two elements of the assembly in spaced relationship, and the fine polishing screen has an end structure which spaces the fine polishing screen from the filter element receiver.

Preferably, the filter elment receiver is a large horizontally elongated box having a filter element chamber and having a plenum at one end of the chamber. The plenum receives oil from the drain and uniformly slows the outflow of oil from the plenum through a large opening which supplies oil to the center of the filter elements.

The end of the filter element receiving box opposite the plenum is closed. The sides, bottom and top of the box, or simply the sides, or the sides and the bottom are perforated to permit flow of the filtered oil out from the box.

The inside walls of the box are constructed or augmented so as to hold the filter elements in position within the box and to prevent flow of oil around ends of the filter element, bypassing the filter. The screen elements may be constructed with fine clearances between the spacers and the surrounding ends of the screen. The screens may be slid in from single ends with opposite ends of the screens closed. Spacers may be constructed on the outside of one end of a screen element and on the inside of the opposite end of the screen element so that the spacers are not required to be slid along the screen surface. Screens may be alternately interfitted from opposite ends with inside and outside spacers on the same end of each screen element. Ends of the screen elements which join the spacers may be constructed of smooth material.

In a preferred embodiment, vertical runners are provided in a box, so that outward extensions of the outer filter element fit within the runners and hold the filter element in precise position. Alternately, runners may be provided for each element when ends of each element protrude from the surrounding element.

The filter and filter elements may be constructed in any desirable shape. Cross sections of the elements may be circular, elliptical or otherwise curved, or may be polygonal. The filter receiving box may be rectangular in plan form and rectangular in cross section or polygonal or curved. It is not necessary that the box be of the same cross sectional shape as the filter elements.

The filter elements may be removed from the box by sliding the elements through a removable end of the box which is remote from the plenum. Preferably, a cover of the box is movable to expose the filter element chamber, so that the entire filter assembly may be lifted out by lifting a handle atop the polishing screen.

The broad objectives of the invention are accomplished by providing the filtering of cooking oil from a cooking pot into a sump tank and the pumping of the filtered oil back into the cooking system and by providing a filter assembly which is convenient and effective in use within such a system.

One object of the invention is the provision of a deep fat frying system employing a cook pot and a heating means associated with the cook pot for heating oil in which food is cooked, a drain means associated with the cook pot, a filter on the drain means filtering oil into a separate sump, and a pump drawing filtered oil from the sump and returning the filtered oil to the cook pot.

Another object of the invention is the provision of a limit switch in a tank containing filtered oil for changing an intake of a pump automatically when filtered oil is no longer available from the tank.

Another object of the invention is the provision of a filter for positioning in a tank spaced from the bottom of the tank and separate from the tank for filtering oil into the tank at a fast flow rate while removing substantially all particulate material from the oil.

The invention has as another object the provision of a filter comprising interfitted elements surrounding a baffle and placed in a receiver box for flowing oil in through one end of the filter elements and out through lateral walls of the elements.

Another object of the invention is the provision of particular filter elements and a filter element receiving box having a plenum in one end, a filter element receiving chamber communicant with the plenum and a horizontally elongated cover which fits on top of the box, completing a seal between the box and elements for promoting lateral outward of the elements through foraminous walls of the box.

These and other objects and features of the invention are apparent in the disclosure, which comprises the foregoing and ongoing specification with the claims, and the drawings.

DETAILED DESCRIPTION OF THE DRAWINGS

Figure 1:
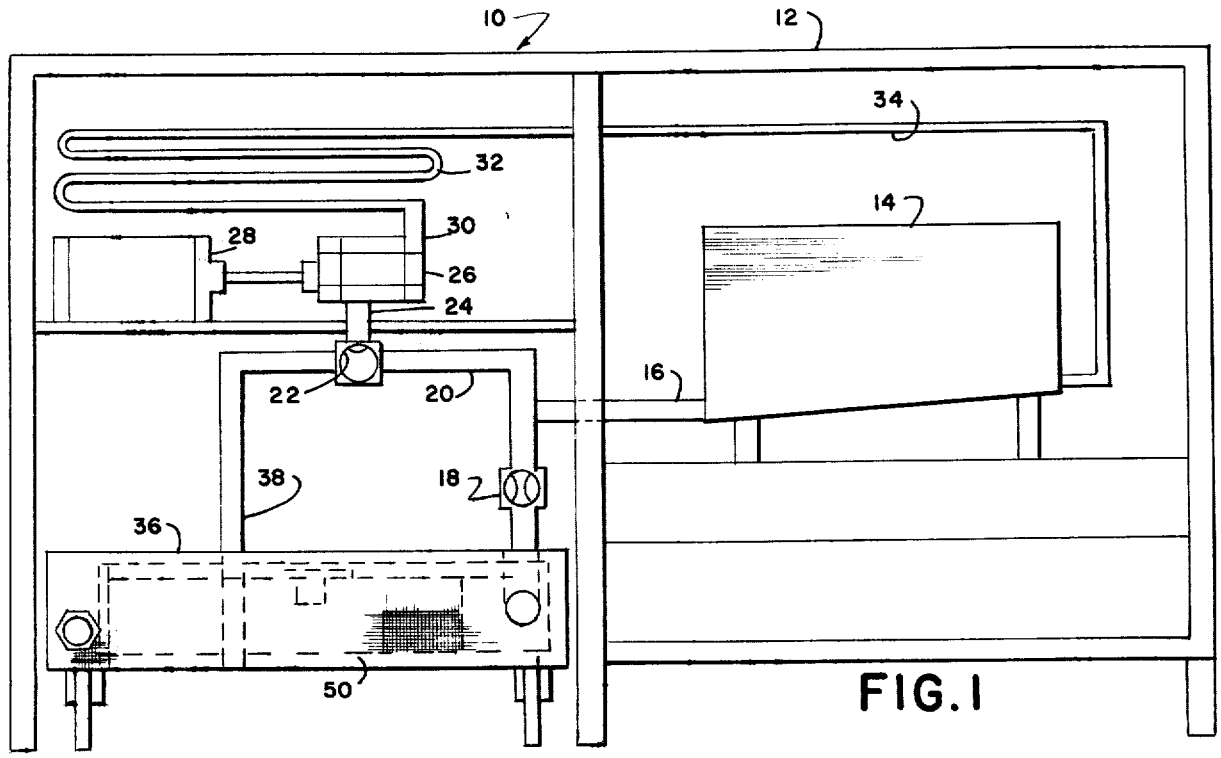
FIG. 1 is a front elevation schematically showing elements of a deep fat frying apparatus.

A deep fat fryer is generally indicated by the numeral 10 in FIG. 1. Frame 12 supports a cook pot 14, which in the present case is a pressurized cook pot. A drain means 16 removes oil from the cook pot. While food is cooking, valve 18 is closed so that oil from the cook pot passes into line 20. Valve 22 is positioned so that oil in line 20 is communicated to an intake 24 of pump 26. Electric motor 28 drives pump 26 to propel oil through outlet 30 and heater 32 back into the cook pot through supply line 34 continuously during the cooking cycle.

When the cooking cycle is finished, heater 32 is turned off; cooking pot 14 is vented; motor 28 is shut off; valve 18 is opened to drain oil from the cooking system; and cooking pot 14 is opened. Oil drains through filter 50, which is described later in detail. Filtered oil flows directly into tank 36.

When the draining of cook pot 14 is complete, valve 18 is closed and valve 22 is changed to connect intake line 38 with pump intake 24. Motor 28 is started, and pump 26 pumps oil through heater 32 into cook pot 14. When the appropriate amount of oil has been pumped into cook pot 14, valve 22 is changed to draw oil from line 20. The cycling of the oil through the heater continues. When the oil reaches the appropriate cooking temperature, food is placed into cook pot 14, and the cook pot is sealed.

Figure 3:
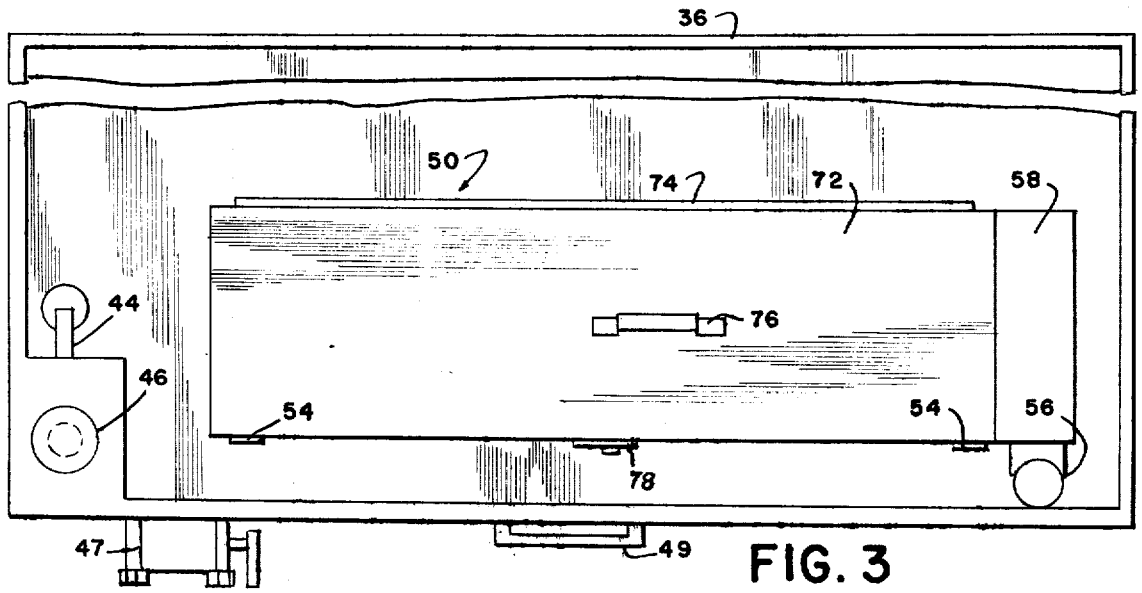
FIG. 3 is a plan view of a sump tank with a filter box mounted within the sump tank.

Float switch 44 as shown in FIG. 3 operates through electrical connection 46 to change the position of valve 22 when a low limit of filtered oil in reservoir tank 36 is sensed by the float switch. When filtered oil is no longer available from tank 36, a pump 26 draws oil from the cook pot 14 through line 20.

Figure 2:
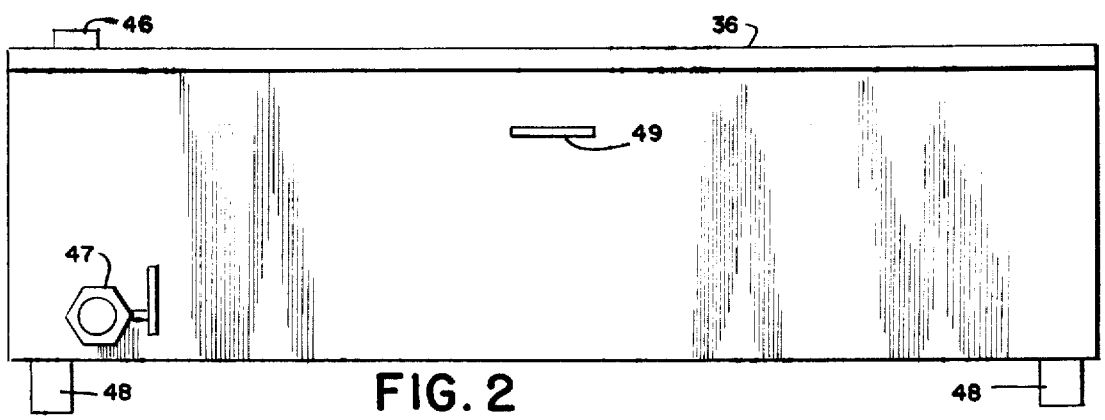
FIG. 2 is a front elevation detail of a sump tank.

As shown in FIG. 2, tank 36 has a low profile. All or a portion of the tank may be covered with a removable cover, or the tank may be configured to slide under a fixed cover. As shown in FIG. 3, the tank has a float switch 44 which may indicate that sufficient oil is in the tank to begin pumping into the cook pot system or that sufficient filtered oil is in the tank to completely fill the cook pot system. An electrical connection 46 communicates float switch 44 with a relay which controls the position of valve 22 for drawing oil from the tank 36 or from the cook pot 14 through pipe 20.

Drain 47 is supplied to empty tank 36. The tank is slid forward on legs 48 by pulling upon handle 49.

As shown in FIG. 3, the filter 50 is positioned directly within the body of tank 36.

Figure 4:
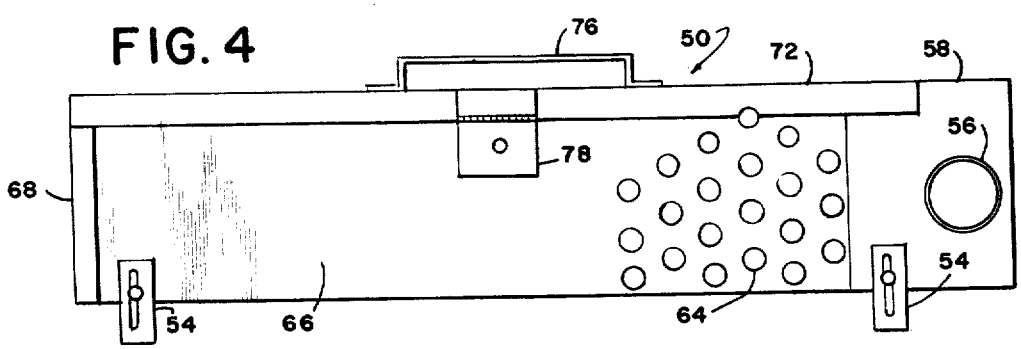
FIG. 4 is a front elevation of the filter box shown in FIG. 3.
Figure 5:
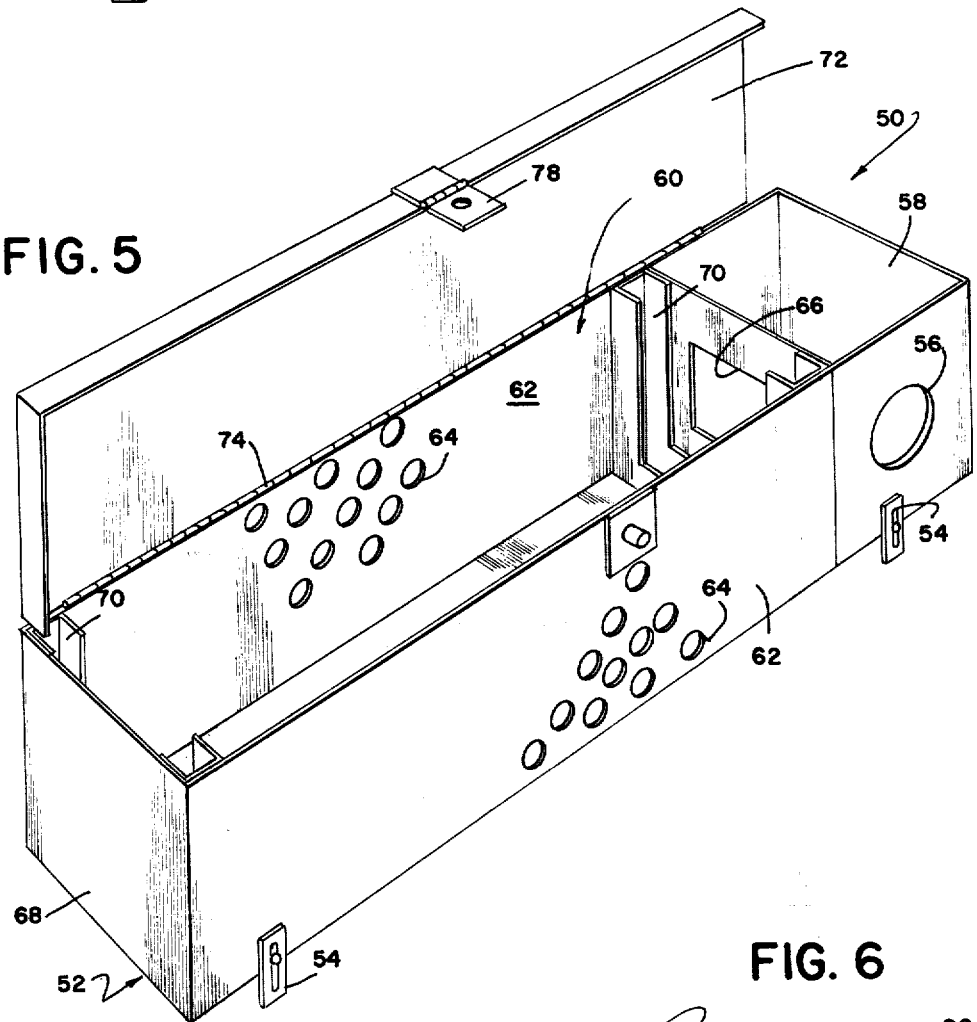
FIG. 5 is a perspective detail of the filter box shown in FIG. 3.

Referring to FIGS. 3, 4 and 5, a filter generally indicated by the numeral 50 has a rectangular housing 52, which is supported on legs 54 above the flat horizontal base of tank 36. Legs 54 are adjustable to permit positioning filter 50 at the optimum vertical position in tank 36.

Inlet 56 is connected to an outlet of the drain by a coupling which permits removal of the entire filter assembly 50. The inlet 56 supplies fluid to a plenum chamber 58, which slows the fluid and permits its even flow into the filter element chamber 60. Lateral walls 62 and the bottom wall of chamber 60 have openings 64 for permitting flow of the oil outward from the filter box 52.

Plenum 58 has an opening 66 which communicates with the filter chamber 60 and which directs oil to the inside of the filter elements which are placed in the box. The opposite wall 68 of th filter chamber is closed. Rails 70 at opposite ends of the filter chamber cooperate with end structures on the outer filter elements, holding the elements in proper position within the chamber. Cover 72 is hinged 74 to one of the side walls, so that it may be lifted by handle 76. A hasp 78 keeps cover 72 tightly closed.

Figure 6:
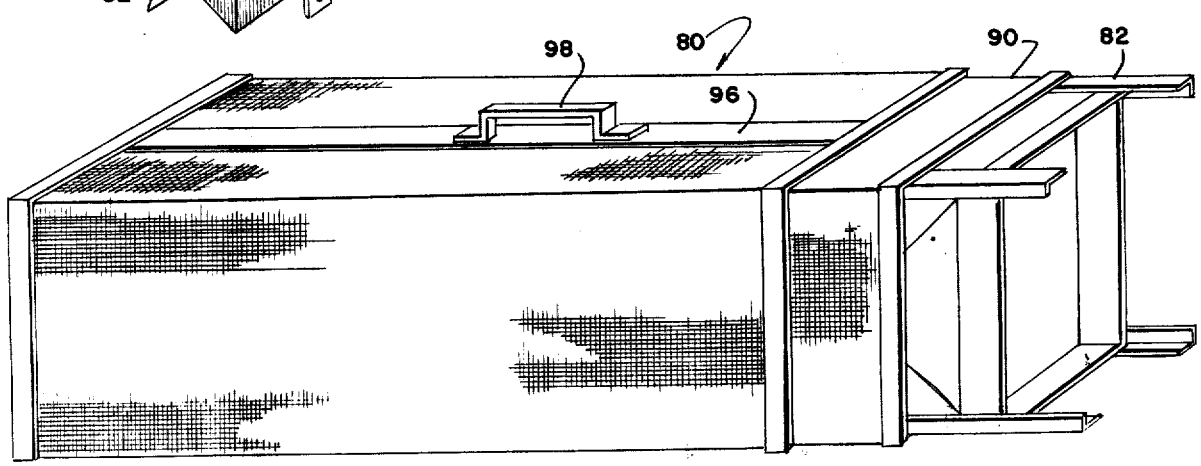
FIG. 6 is a partially assembled perspective view of the filter elements which are assembled for positioning in the filter box shown in FIG. 5.
Figure 7:
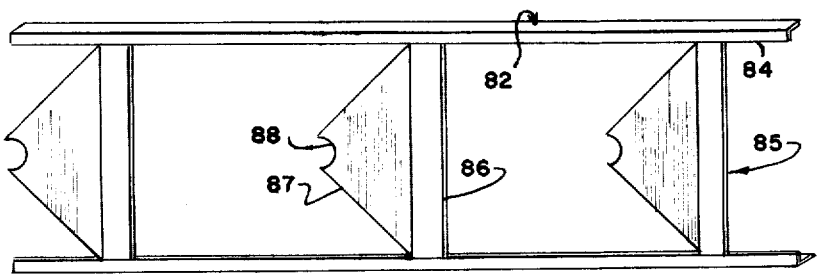
FIG. 7 is an elevational detail of a baffle assembly.

Filter elements are shown in FIG. 6 through 10. As shown in FIG. 6, the filter elements generally indicated by the numeral 80 are partially assembled. Pressing the baffle frame 82 and the inner screen to the left so that edges are juxtaposed, completes the assembly.

Referring to FIG. 6, a baffle assembly 82 comprises four parallel frame pieces 84, which are joined by baffles 85. Each baffle has a rectangular frame 86 and a frustro-pyramid 87 formed of sheet metal. A central hole 88 permits passage of oil. The preferential flow direction is from right to left. The baffles even out the flow and entrap large particles between the baffles.

Figure 8:
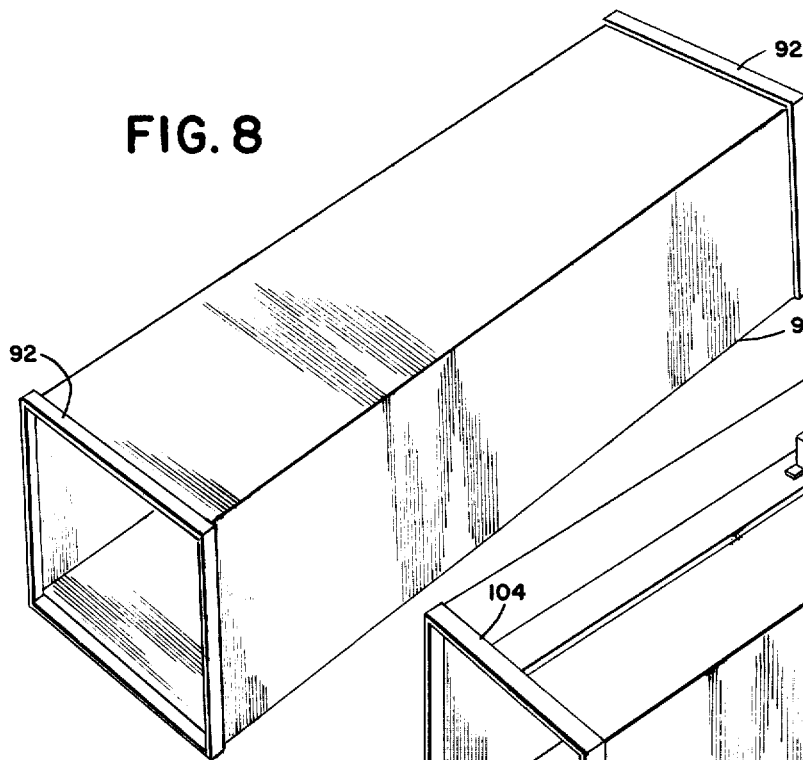
FIG. 8 is a perspective detail of a filter screen which fits over the baffle of FIG. 7.
Figure 9:
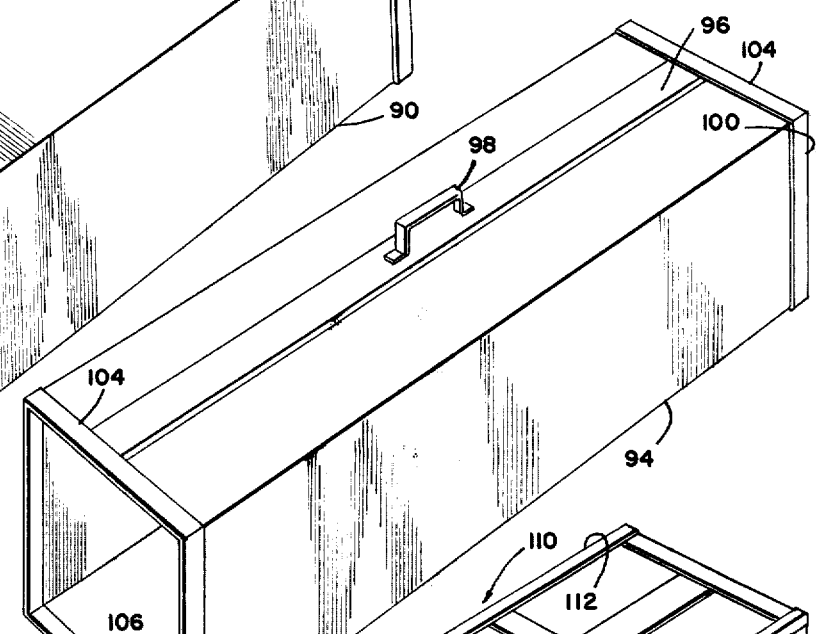
FIG. 9 is a detail of a filter screen which fits over the filter screen of FIG. 8.

FIG. 8 shows a primary fine screen 90, which slips over the baffle assembly 82. Ends 92 of primary screen 90 are slightly enlarged to provide spacing of the secondary screen 94 shown in FIG. 9. The secondary screen has an upper central reinforced portion 96 and a handle 98 for lifting the entire filter element assembly from the filter element chamber in box 52. End structure 100 comprises vertical runner 102, which fit within corresponding grooves 70 in the filter box and which seal the filter chamber and prevent flow of oil around the filters rather than through the filters. Upper end pieces 104 seal against the cover, and lower end pieces 106 fit within corresponding grooves in the base of the filter box.

Figure 10:
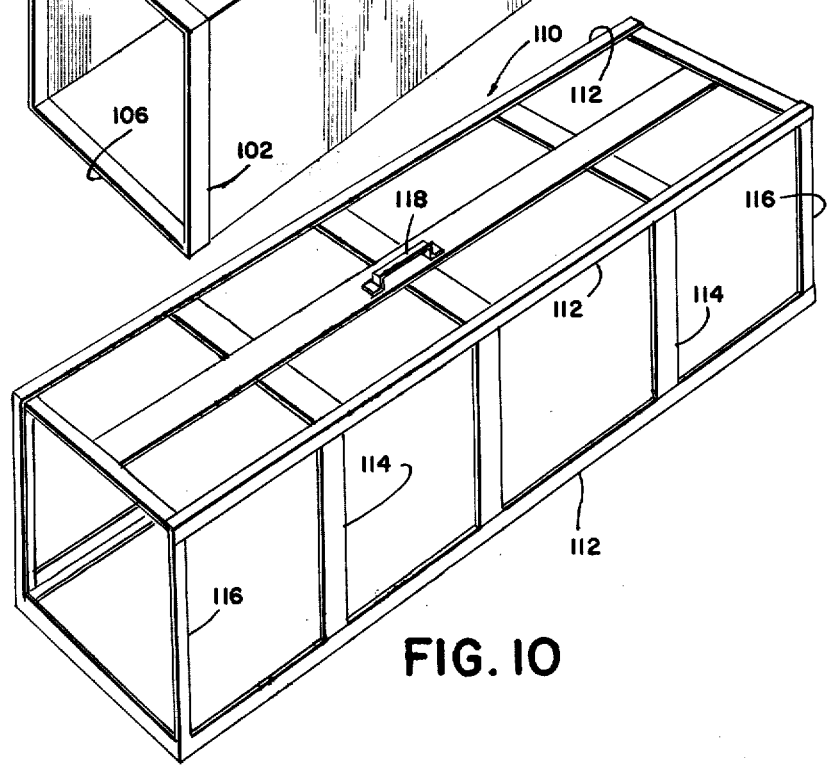
FIG. 10 is a perspective detail of a polishing filter screen which is used singly or in replacement of the screen shown in FIG. 9 when polishing the oil in a periodic process.

Polishing screen 110 as shown in FIG. 10 may be used with filter elements 82 and 90 or may be used separately in the filter element chamber for polishing the oil. Polishing screen 110 comprises four parallel frame elements 112, which support transverse frames 114. Extremely fine screens or foraminous material with extremely fine holes are stretched across frames 114, parallel to frame elements 112. Vertical guides 116 fit within the grooves 70 in the filter element chamber. Handle 118 allows the polishing screen element to be lifted from the chamber when the cover is open.

In operation, oil holding tank 36 is filled with clean cooking oil. Valve 22 is in its first position, which communicates intake pipes 38 and 24. Valve 18 is closed. Motor 28 drives pump 26, propelling oil through heater 32 into cook pot 14. As the cook pot is filled, float switch 44 in tank 36 drops to its low level. A solenoid shifts valve 22 to its second position, shutting off flow from line 38 and communicating lines 20 and 24. Pump 26 continues to circulate oil through heater 32 into cook pot 14. As the temperature is brought to cooking temperatue, food is placed in pot 14, and the cover is closed. The cook cycle continues for a predetermined time, while pump 26 forces oil through the heater 32 and into the cook pot to maintain the cooking temperature.

At the end of a predetermined cooking time, heater 32 is turned off, cook pot 14 is vented, pump 26 is stopped, and drain valve 18 is opened. All of the oil in the cook pot 14 drains through filter 50 into tank 36.

At the end of the drain cycle, a button is pushed. Valve 18 is closed, valve 22 is shifted to its first position, pump 26 is started, heater 32 is turned on, and the fill and cook cycle continues in the above described manner.

In all cases, as soon as the float valve 44 drops to a predetemined low level, valve 22 switches to its second position, shutting off line 38 and causing oil to be drawn from line 20. If for some reason, the filter is jammed, so that insufficient oil passes through the filter, the pump does not run dry but rather circulates oil from the cook pot through the heater. A jammed filter may prevent the full draining of the cook pot. Consequently, oil is still available in the cook pot.

The present system is designed to replace an earlier system, in which the level of oil in the tank may be high, although no oil passes through a jammed filter on the intake of a pump. In that case, the pump continues to run dry, since float valve 44 does not recognize that no oil is flowing through the pump.

In the present case, the filter is placed directly in the tank. That positioning has several advantages, in that the full lateral area of the filter is employed for floating oil out through the filter and that there is little pressure differential on opposite sides of the filter, and that the mass within the filter is included in the mass within the tank so that the volume of oil in the system is not affected by the use of the present filter.

Although this invention has been described with reference to specific embodiments, modifications and variations may be constructed without departing from the scope of the invention, which is defined in the following claims.

I claim:

1. Deep fat cooking apparatus comprising a cooking pot, oil heating means connected to the cooking pot for heating cooking oil, drain means connected to the cooking pot for removing oil from the cooking pot, a filter connected to the drain means for filtering oil flowing through the filter from the drain means, a separate tank communicating with the filter for storing filtered oil from the filter, and propulsion means connected to the tank and to the cooking pot for flowing oil from the tank, whereby oil freely flows from the filter means to the tank and whereby filtered oil freely flows from the tank through the propulsion means, wherein the filter comprises a horizontally elongated housing having an opening near one end for receiving oil from the drain means and having a plurality of lateral openings for flowing oil into the tank.

2. The apparatus of claim 1 wherein the propulsion means comprises a two way valve, a first pipe connected between the two way valve and the tank and a second pipe connected between the two way valve and the drain means, a pump having an intake connected to the two way valve and having outflow means connected to the cooking pot and power means connected to the pump for driving the pump and further comprising means mounted in the tank and connected to the two way valve for changing the two way valve to connect the second pipe to the intake upon filtered oil in the tank being predeterminedly deplenished.

3. The apparatus of claim 1 wherein the tank comprises a horizontally disposed tank and wherein the filter is spacedly positioned within the tank above a bottom of the tank.

4. The apparatus of claim 3 wherein the filter is supported on legs above a bottom of the tank.

5. The apparatus of claim 1 wherein the filter comprises a horizontally elongated filter element receiver box having a plenum at one longitudinal end, connection means mounted on the plenum for connecting the drain means to the plenum, elongated filter core means mounted in the receiver box and having one end communicant with the plenum for receiving oil from the plenum, the filter core means comprising an elongated baffle frame having a plurality of transverse baffles for interrupting flow of oil through the baffle frame and for trapping large particles, each transverse baffle having an opening for passing oil in the direction of a subsequent baffle, a fine screen laterally surrounding the baffle frame for permitting flow of oil through the screen while entrapping particles on a side of the screen adjacent the baffles, the fine screen being constructed in an open ended body having a shape similar to the baffle frame and being slidable over the baffle frame, a secondary polishing screen having a similar shape and being slidable over the fine screen for filter refining oil passing from the fine screen through the secondary polishing screen, the polishing screen having handle means on an upper side thereof, and the receiver box having an upward opening slightly larger than the filter element means and having a movable cover at the opening whereby the cover may be removed and the filter element may be lifted from the receiver box by lifting the handle on the secondary polishing screen, the receiver box further comprising foraminous siding adjacent the filter element for permitting lateral flow from the secondary polishing screen through the foraminous siding.

* * * * *